(12) United States Patent  
Stewart

(10) Patent No.: US 7,938,158 B2
(45) Date of Patent: May 10, 2011

(54) PUNCTURE RESISTANT PNEUMATIC TIRE

(75) Inventor: David R. Stewart, Kent, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 918 days.

(21) Appl. No.: 11/832,817

(22) Filed: Aug. 2, 2007

(65) Prior Publication Data
US 2009/0032156 A1 Feb. 5, 2009

(51) Int. Cl.
B60C 9/18 (2006.01)
B60C 9/22 (2006.01)
B60C 9/28 (2006.01)

(52) U.S. Cl. ........ 152/526; 152/527; 152/531; 152/533; 152/535; 152/538

(58) Field of Classification Search .................. 152/165, 152/167, 169, 196, 197, 198, 203, 205, 206, 152/526, 527, 531, 533, 535, 537, 538
See application file for complete search history.

(56) References Cited

U.S. PATENT DOCUMENTS

| 500,468 A | 6/1893 | Boyd |
| 559,987 A | 5/1896 | Wagenen |
| 560,196 A | 5/1896 | Dean |
| 939,611 A | 11/1909 | Midgley |
| 943,371 A | 12/1909 | Angelicoia |
| 969,722 A | 9/1910 | Pitman |
| 1,327,503 A | 1/1920 | Varner |
| 1,431,089 A | 10/1922 | Ward |
| 1,481,468 A | 1/1924 | Tobin |
| 1,482,217 A | 1/1924 | Broluska |
| 1,904,502 A | 4/1933 | Michelin |
| 2,160,219 A | 5/1939 | Kramis |
| 3,640,329 A | 2/1972 | Chien |
| 3,850,219 A | 11/1974 | Snyder |
| 4,050,495 A * | 9/1977 | Olsen ............................ 152/187 |
| 4,456,048 A | 6/1984 | Markow et al. |
| 5,010,937 A * | 4/1991 | Janus ............................ 152/531 |
| 5,417,268 A | 5/1995 | Janus |
| 5,556,488 A | 9/1996 | Gergele et al. |
| 5,597,426 A | 1/1997 | Ludwig |
| 5,817,197 A * | 10/1998 | Mani ............................ 152/199 |
| 6,029,725 A | 2/2000 | Mani |
| 6,363,983 B1 | 4/2002 | Chen |
| 7,201,944 B2 | 4/2007 | Hergenrother et al. |

FOREIGN PATENT DOCUMENTS

WO WO 2006/088195 * 8/2006

* cited by examiner

Primary Examiner — Justin Fischer

(57) ABSTRACT

A puncture resistant pneumatic tire has a tread portion and a pair of lateral tread edges. A belt package is located radially inward of the tread portion and a carcass structure has at least one body ply which extends between and is turned up around a pair of bead cores. A protective band extends circumferentially about the tire radially beneath the tread portion and includes a plurality of circumferentially spaced metal rods, each of which extends in a lateral direction between the tread edges. The protective band may be located radially inward or outward of a spiral ply layer and the rods may be arranged in a staggered laterally offset layered relationship. The rods have a circular cross-section with a diameter of between 1/16 inch and 1/4 inch and a length of between 7 inches and 8 inches and will deflect and dislodge the pointed end of road debris before it completely punctures the tire.

8 Claims, 6 Drawing Sheets

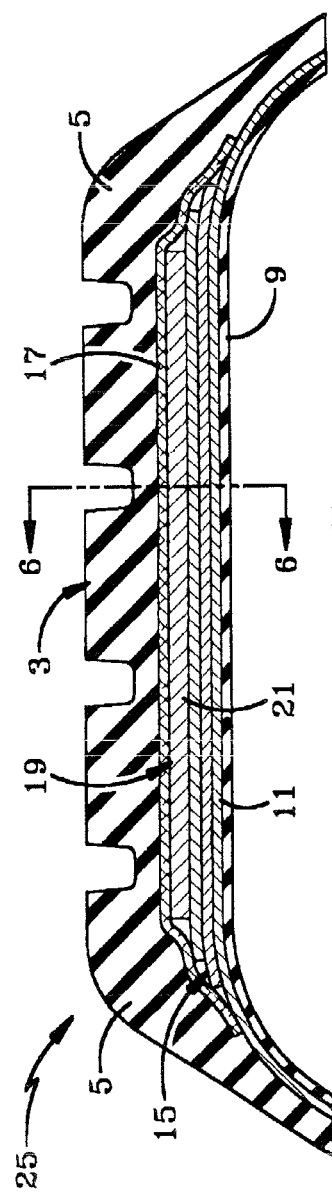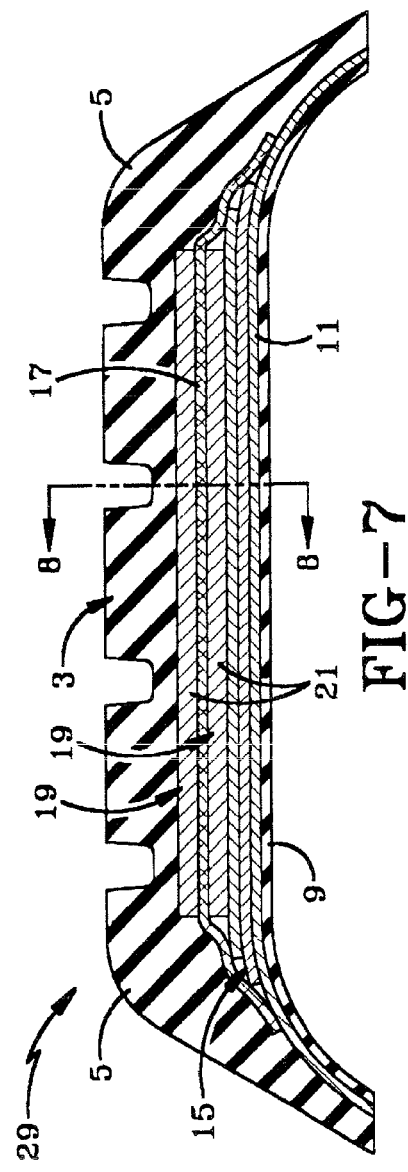

PUNCTURE RESISTANT PNEUMATIC TIRE

BACKGROUND OF THE INVENTION

1. Technical Field

The invention relates to an improved tire construction wherein a protective layer extends circumferentially about the tire for deflecting and dislodging lightweight road material before it penetrates the innerliner of the tire. The protective layer is a plurality of circumferentially spaced metal rods located beneath the tread portion

2. Background Information

Numerous tire constructions have been developed which have an internal reinforcement or band of material to prevent sharp objects from penetrating beyond the tread and into the inner air chamber of the tire to reduce puncture and loss of air. Many of these prior art tire constructions use various overlapping steel plates, which although perform satisfactory in preventing puncture, results in an expensive tire which may provide a less than desirable ride characteristic. Some examples are shown in U.S. Pat. Nos. 5,599,987, 560,196, 500,468, 939,611, 1,327,503, 1,431,069, and 3,640,329. Other such tire constructions use a heavy-type of fabric reinforcement such as shown in U.S. Pat. No. 969,722. Another puncture resistant tire is shown in U.S. Pat. No. 1,482,217 which uses a combination of overlapping layers of fabric and wires wherein the wires extend in crosswise fashion with respect to the fashion with respect to the reinforcing strips. The wires extend in a circumferential relationship around the tire and can be staggered and extend crosswise of the fabric reinforcing strips.

U.S. Pat. No. 6,029,725 discloses a tire construction having stiff plates arranged circumferentially about the tire to form a belt which is stiff in the in-plane or steering torsional direction but quite flexible in the radial direction. Although it may provide some puncture resistance, it does not achieve such a result as the present invention wherein circular rods are used to provide deflection of sharp road objects before they penetrate the innerliner instead of providing a physical barrier which prevents penetration.

Therefore, the need exists for an improved pneumatic tire which contains a relatively inexpensive, lightweight protective strip formed a circumferentially spaced cylindrical rod which extends circumferentially around the tire beneath the tread portion thereof, which will deflect many types of sharp objects before they penetrate the body carcass and innerliner of the tire.

BRIEF SUMMARY OF THE INVENTION

One aspect of the present invention is to provide a puncture resistant pneumatic tire having a plurality of internal laterally extending cylindrical metal rods spaced circumferentially around the tire which will deflect and dislodge lightweight road debris before it punctures the innerliner of the tire.

Still another aspect of the present invention is to space the rods laterally between the tread portion and a spiral overlay with the circumferential spacing of the metal rods being in the range of 0.5 inches to 1.5 inches.

Another feature of the present invention is that the use of such circumferentially spaced metal rods when combined with the rotating motion of the tire, will deflect upright lightweight road material such that its pointed end will be knocked over by adjacent metal rods before the object completely punctures the tire.

A further feature of the present invention is to enable the metal rods to be embedded in a rubber layer which could be manufactured separately from the tire and then brought to the tire building drum and stitched on the tire carcass with the tread package.

A still further feature of the present invention is to arrange the metal rods in a staggered relationship in the same protective belt or provide the staggered relationship by a pair of belts which are placed on opposite sides of a spiral cap overlay.

Still another objective is to provide the rods with a slight curvature to enable the rods to conform more closely with the natural arc-shape of certain tires or form the rods without any curvature for other types of tires.

Another objective is to form the rods of metal having a brass coating with a circular cross-section with a diameter of between $1/16$ inch and $1/4$ inch so as to tightly bond with the adjacent rubber material of the tire.

These objectives and advantage are obtained by the puncture resistant pneumatic tire of the present invention, the general nature of which may be stated as including a tread portion having a pair of lateral tread edges; a belt package located radially inward of the tread portion; a pair of bead portions; a carcass structure having at least one body ply extending between each of the bead cores with at least one ply turned-up around the bead core in an axially outward direction; a pair of sidewalls extending radially from the lateral tread edges of the tread portion to the bead portions; and a protective band extending circumferentially about the tire radially beneath the tread portion to deflect sharp objects penetrating the tread portion, said band including a plurality of circumferentially spaced rigid rods, each rod extending laterally between the tread edges.

BRIEF DESCRIPTION OF THE SEVERAL VIEWS OF THE DRAWINGS

Preferred embodiments of the invention, illustrative of the best modes in which Applicant contemplates applying the principles, are set forth in the following description and are shown in the drawings and are particularly and distinctly pointed out and set forth in the appended claims.

FIG. 5 is a cross-sectional view of a second embodiment wherein the protective band is located between a spiral ply overlay and the belt package of the tire.

FIG. 7 is a fragmentary sectional view similar to FIG. 5 showing a third embodiment wherein a pair of protective puncture resistant protective bands are utilized with the spiral ply overlay sandwiched therebetween.

Similar numbers refer to similar parts throughout the drawings.

DETAILED DESCRIPTION OF THE INVENTION

Figure 1:
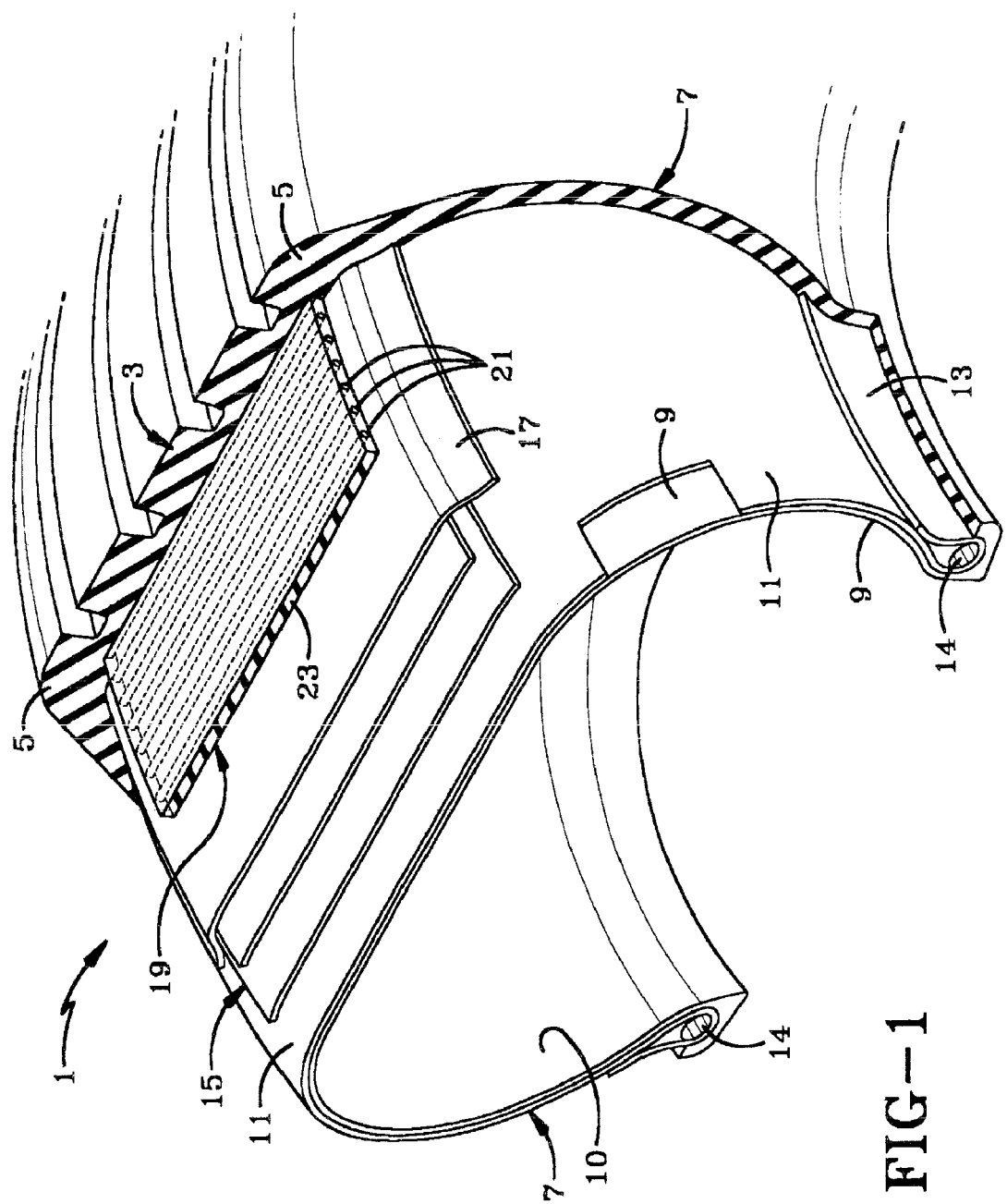
FIG. 1 is a diagrammatic partially sectioned perspective view of a tire having the puncture resistant protective band incorporated therein.

A first embodiment of the present invention is shown in FIG. 1, and is an improved tire 1 of the pneumatic version and configured in the standard toroidal shape with an opening in the middle for receiving a wheel rim. Improved tire 1 is shown in cross-section in FIG. 1 and provides a tire construction that has increased puncture resistance. Specifically, tire 1 includes an outer tread portion 3 terminating in a pair of laterally spaced tread shoulders 5, and has two sidewall regions 7. Tire 1 further includes an air impervious innerliner 9 forming an internal air chamber 10. A carcass having one or more body plies 11 will be located radially beneath the tread, with one of the body plies having a turned-up portion 13 extending about a bead area 14. A belt package 15 usually consisting of one or more steel reinforced belts will be located between the body plies and tread package. For many tire constructions a spiral ply 17 will be located radially inwardly between tread portion 3 and belt package 15. All of these components are well-known in the tire construction art and thus are not described in further detail and can vary without affecting the concept of the present invention.

Figure 2:
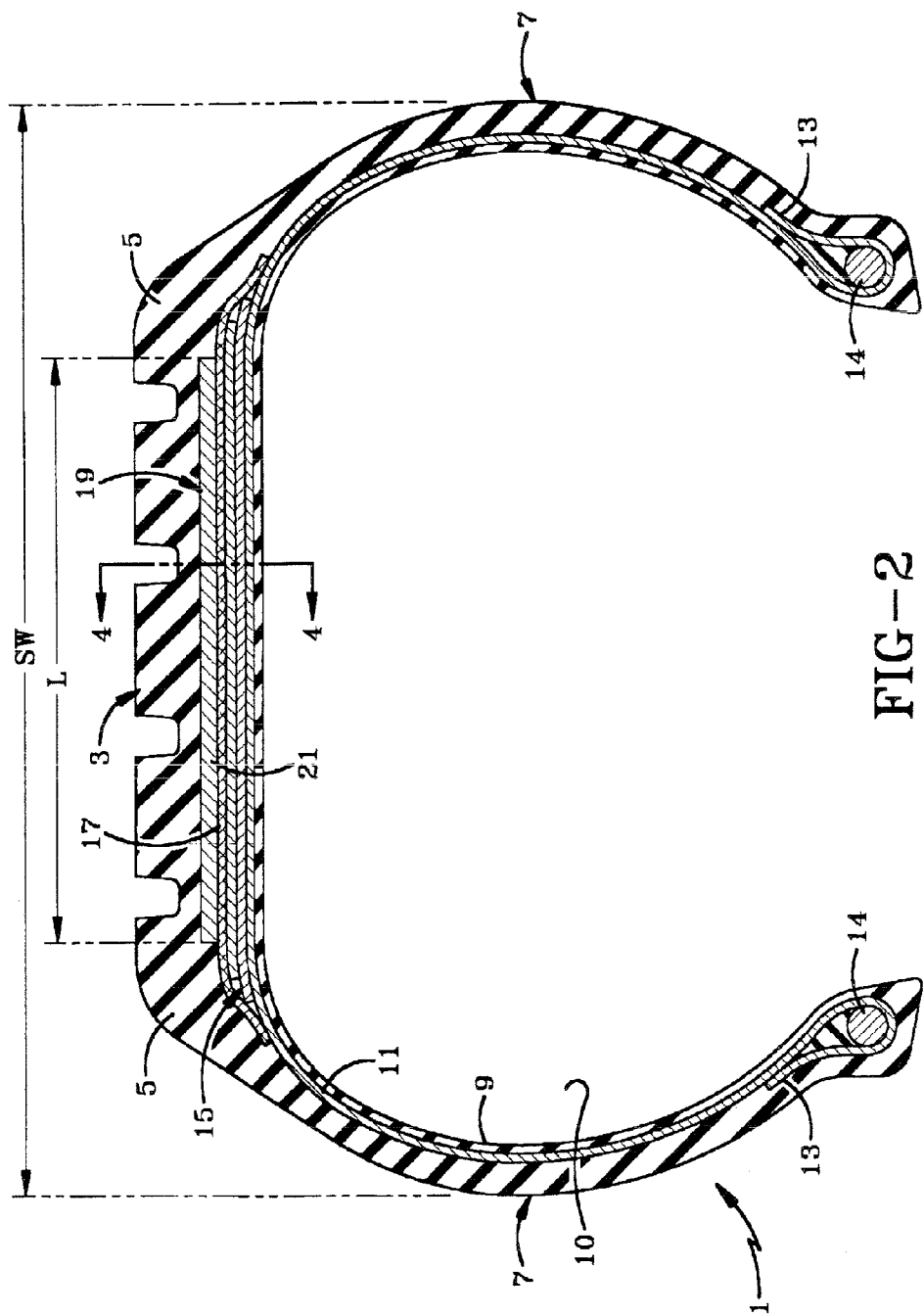
FIG. 2 is a cross-sectional view of the tire shown in FIG. 1.
Figure 3:
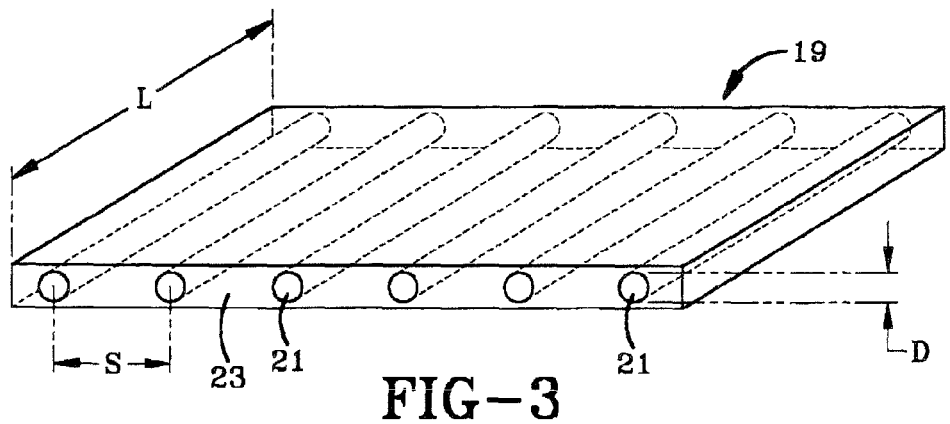
FIG. 3 is a diagrammatic perspective view of a portion of the puncture resistant protective band of the present invention.
Figure 4:
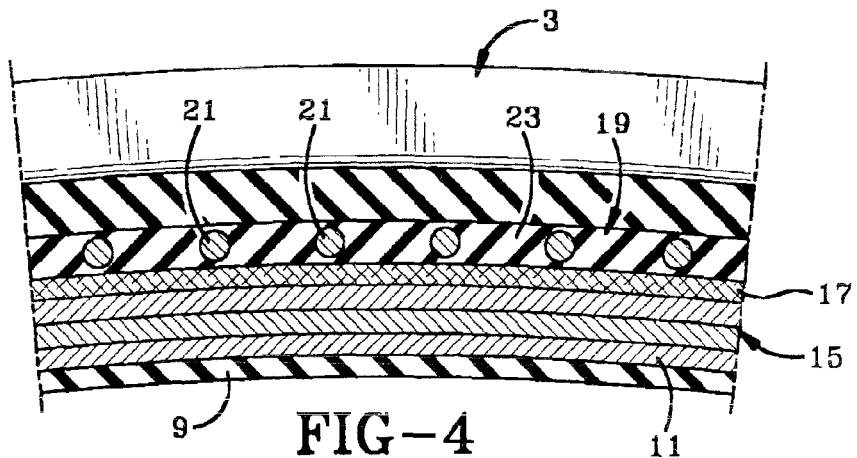
FIG. 4 is an enlarged fragmentary sectional view taken on line 4-4, FIG. 2.

In accordance with the invention, a puncture resistant protective layer or band indicated generally at 19, extends circumferentially about the tire. In the first embodiment of FIGS. 1-4, band 19 lies radially beneath tread portion 3 and above spiral ply 17 and belt package 15. As shown specifically in FIGS. 3 and 4, protective band 19 consists of a plurality of steel rods 21 preferably having circular cross-sectional configurations, although this could vary slightly such as oval, oblong, etc. Rods 21 are spaced circumferentially from each other in the band a distance S (FIG. 3), and extend laterally across the tire beneath tread portion 3 having a length L, as shown in FIG. 2. Circumferential spacing S for most tire constructions will be within the range of 0.5 inches and 1.5 inches.

Rods 21 are encased in rubber 23, which may be the same type of rubber as that used for forming tread portion 3 and sidewalls 7, although it could vary without affecting the invention. For example, it could be a rubber which adheres well to steel or brass coated objects. Rods 21 preferably are formed of steel and may be brass coated in order to adhere more efficiently to the surrounding rubber. Rubber 23 could also be of the type shown and described in U.S. Pat. No. 7,201,944, the contents of which are incorporated herein by reference, which provides a vulcanizable rubber composition having improved metal adhesion eliminating the need for brass coating of the rods.

Rods 21 have a diameter D (FIG. 3) in the range of 1/16 inch to 1/4 inch. For most sizes of passenger tires rods 21 will have a diameter of 1/8 inch. Rods 21 have a straight linear configuration and will have a length L (FIG. 2). For many types of tires, length L will be 0.0286 inches for each 1 mm of tire section width (SW). Thus, for a passenger tire P245/50R17, rods 21 will have a length of approximately 7 inches. This length ensures that the lateral ends of the rods do not extend through tire shoulders 5 even after appreciable wear of the shoulder area. As shown in FIGS. 1-4, protective band 19 is located radially inwardly beneath tread portion 3 and above spiral ply 17 if used in the tire, and above belt package 15.

Figure 6:
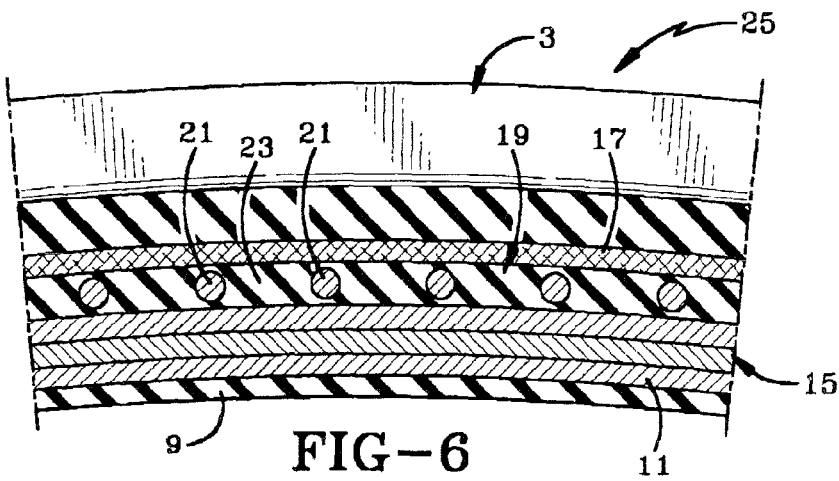
FIG. 6 is an enlarged fragmentary sectional view taken on line 6-6, FIG. 5.

A modified tire embodiment is shown in FIGS. 5 and 6, and is indicated generally at 25. In tire 25, the protective band 19 is located between spiral ply 17 and belt package 15. Protective band 19 will have the same configuration as that discussed above, with the only difference being that band 19 is located radially inwardly of spiral ply 17 between ply 17 and belt package 15.

Figure 8:
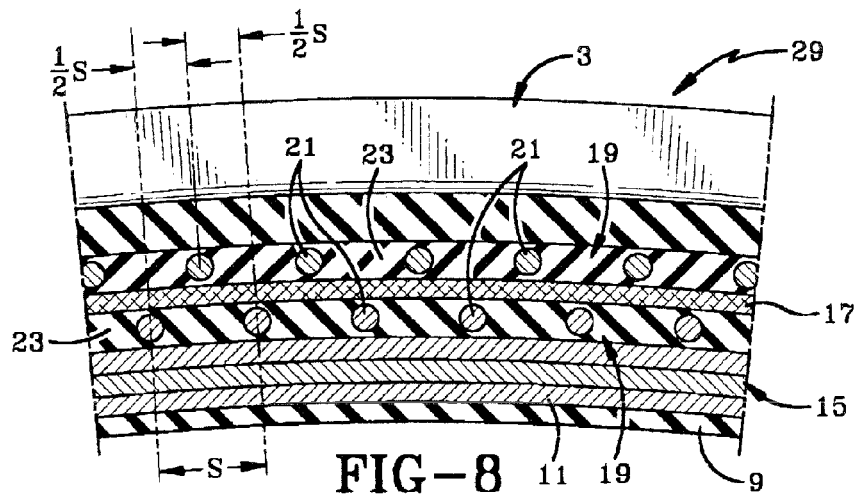
FIG. 8 is an enlarged fragmentary sectional view taken on line 8-8, FIG. 7.

A third embodiment is shown in FIGS. 7 and 8 and is indicated generally at 29. Tire 29 includes two separate protective bands 19 with the outer band 19 being located between tread portion 3 and spiral ply 17 with the inner band 19 being located between spiral cap 17 and belt package 15. The construction of each of the protective bands 19 is similar to that described above. However it is desirable that bands 19 when assembled with belt package 15 and spiral ply 17 are arranged so that the individual rods 21 in each band are laterally offset with respect to the rods in the other band as shown in FIG. 8.

Figure 8A:
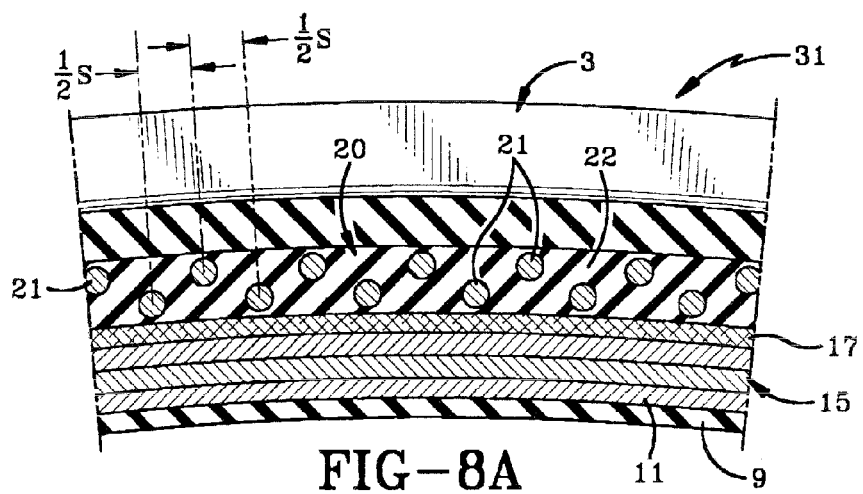
FIG. 8A is a sectional view of a further embodiment wherein a protective band containing offset rods is mounted between the tread portion and belt package.

FIG. 8A shows a further embodiment indicated generally at 31 which includes a modified band construction 20. Band 20 contains two separate rows of rods 21 encased in rubber 22, with each of the rods in one row being laterally offset with respect to the adjacent rods in the other row. Band 20 could be located above or below spiral ply 17 if used in the tire or between tread portion 3 and belt package 15 if no spiral ply 17 is used.

Figure 9:
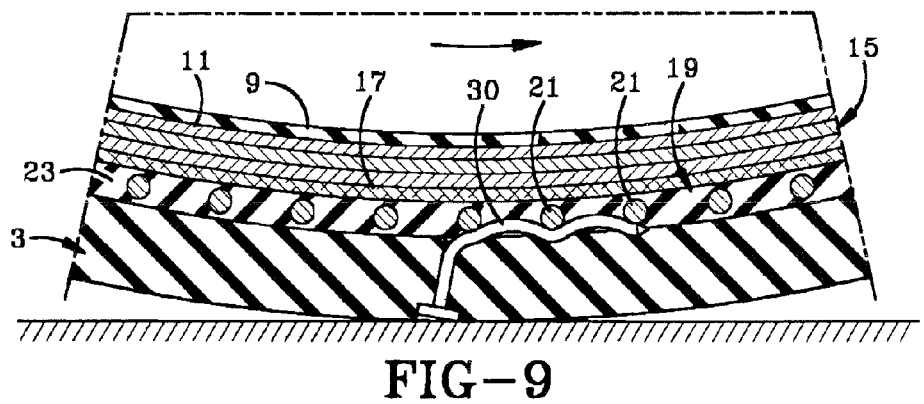
FIG. 9 is a diagrammatic sectional view showing the intended function of the protective band for deflecting sharp objects from penetrating into the air chamber of the pneumatic tire.

FIG. 9 is a diagrammatic view showing how the rotational movement of the tire, and in particular steel rods 21, will prevent a sharp object 30, even though it is smaller than the spacing S between the rods, from piercing innerliner 9. As the object 30 begins to enter a space between adjacent rods will be bent by the succeeding rods due to the speed of the tire rotation. Thus, as soon as a sharp object 30 such as a nail, pierces tread portion 3, it will be immediately contacted by a moving rod 21 which will bend it with each of the succeeding rods further bending it and preventing it from passing between the space between the rods. This same deflection action will also occur with other types of sharp pointed objects such as spike-like road debris which would be knocked over by the moving rods, whether the objects are thinner or larger than the spacing S between the rods.

Figure 10:
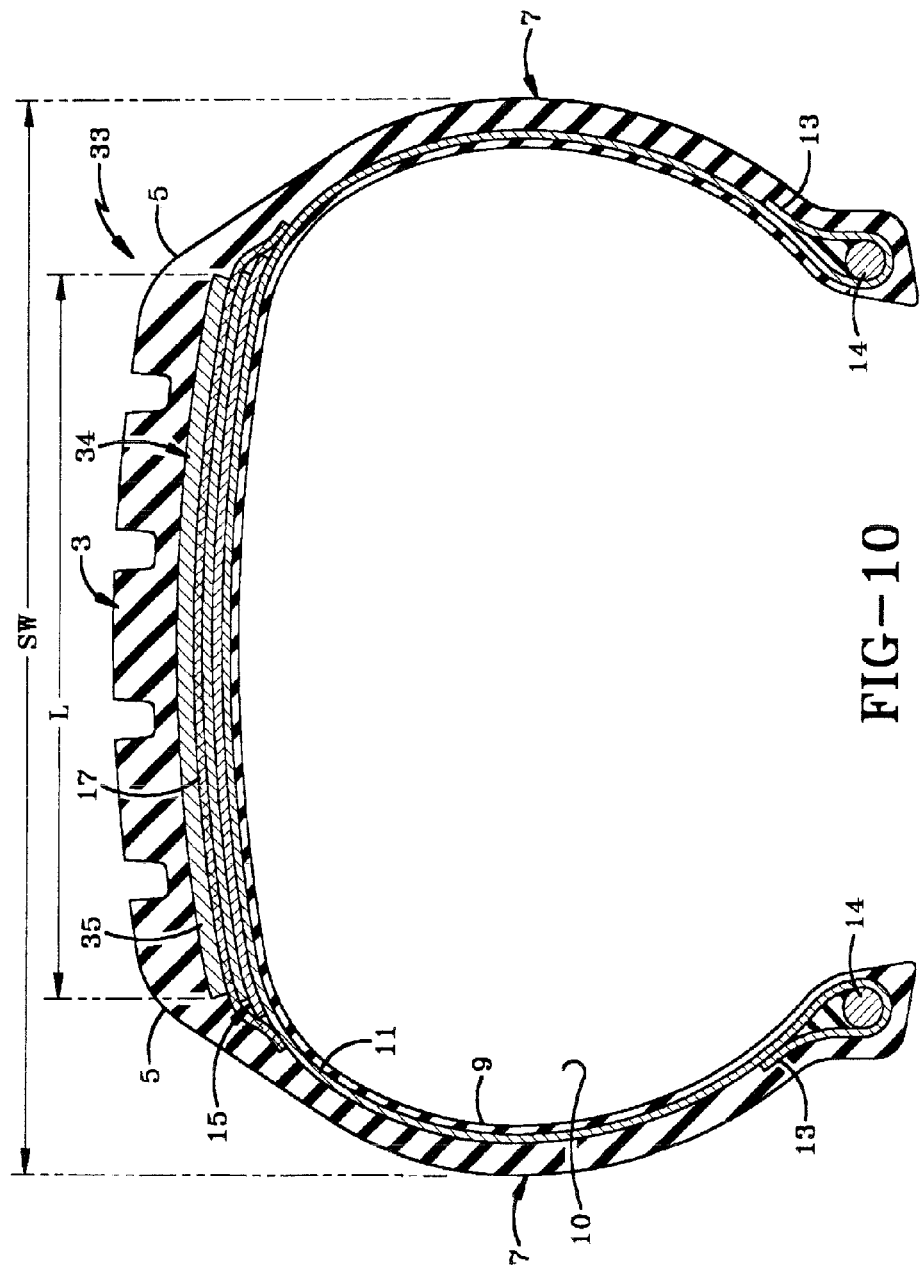
FIG. 10 is a cross-sectional view of a further embodiment of the present invention similar to FIG. 2 wherein the rods of the protective band have a slightly curved configuration to conform with the natural arc-shape of the tire.

Another embodiment of the improved tire construction is indicated generally at 33, and shown in FIG. 10. Tire 33 is similar to the various embodiments described above with the main difference being that the protective band 34 will have steel rods 35 incorporated therein which will have a slight arcuate curvature thereto in order to conform to the natural arc-shape of certain tire cross-sections rather than the straight linear configuration of rods 21. Certain sizes and types of pneumatic tires have greater arcuate cross-sectional configurations than other tires, and for certain tires having a greater arcuate section shape, it would be desirable to provide a very slight arc to rods 35 encased within rubber 23. It has been found that with curved rods 35, that for every 1 mm of nominal tire section width SW the rod will have a length of 0.033 inches. This will provide a slightly longer linear length rod in order to provide sufficient length for adequate protection of the areas of tread 3 in which punctures will occur, yet prevents the lateral ends of the rods from piercing tread shoulder areas 5 even after wear. Thus, for a tire P245/50R17, it will result in curved rods 35 having a length of approximately 7.5 inches. For other tires, rods 35 can be 8 inches in length. Whether to use straight linear rods 21 in protective band 19 or slightly curved rods 35 in band 34 will depend upon the particular type and size of the tire in which the protective band is incorporated and the type of vehicle on which the tire will be mounted.

In summary, the improved puncture resistant tire of the present invention provides a tire in which road debris such as upright nails, screws and other sharp pointed objects will be deflected sufficiently by the internal laterally extending metal rods spaced circumferentially around the tire to prevent the sharp points of the debris from penetrating the innerliner of the tire resulting in loss of air. The metal rods can be staggered, such that one group of rods is offset with respect to the other radially adjacent rods, whether the rods are contained each in their own separate belt or the offset rods are contained in the same belt rubber encasement. Furthermore, the protective band can be located between the tread portion and spiral ply and/or belt package of the tire or radially between a spiral ply and belt package. Also, if two or more protective bands are utilized, they can be spaced between the spiral cap and belt package as desired.

Also, protective bands 19 and 20 can be manufactured at a separate site than the other tire components and brought to the tire building drum to be stitched in along with the tread portion, belt package and spiral ply to facilitate the tire building process.

The metal rods combined with the rotating motion of the tire, will deflect most upright lightweight road debris such that the pointed end of the debris will be knocked over by succeeding rods before the object completely punctures the tire. This provides for an effective puncture resistant band than that provided by the use of overlapping steel plates or adjacent steel plates which prevents the sharp objects from penetrating through the plates themselves and reaching the inner air chamber of the tire. The various compounds contacting the metal rod must be carefully chosen or the rods brass coated to provide the desired bonding characteristics to enable the encasement rubber to be compatible with the adjacent tread rubber and tire component rubber to ensure sufficient bonding therebetween to prevent delamination of the protective band from the other tire components.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A puncture resistant pneumatic tire comprising:
   a tread portion having a pair of laterally spaced tread shoulders;
   a belt package located radially inward of the tread portion;
   a pair of bead portions;
   a pair of sidewalls extending radially from the tread shoulders to the bead portions;
   a protective band extending circumferentially about the tire radially beneath the tread portion to deflect sharp objects penetrating the tread portion, said band including a plurality of circumferentially spaced rigid rods, each rod extending laterally between the tread shoulders and formed of metal having a circular cross-section with a diameter in the range of $1/16$ inch and $1/4$ inch and circumferentially spaced apart a distance in the range of 0.5 inches and 1.5 inches and having a length with opposed lateral ends terminating within the tread shoulders and located radially inwardly between the tread portion and belt package; and
   a carcass structure having at least one body ply extending between each of the bead cores and a spiral ply overlay located between the protective band and the body ply.

2. The pneumatic tire defined in claim 1 wherein the rods have a diameter of $1/8$ inch.

3. The pneumatic tire defined in claim 1 wherein the rods are circumferentially spaced a distance of 1.0 inches.

4. The pneumatic tire defined in claim 1 wherein the rods are encased in rubber.

5. The pneumatic tire defined in claim 1 wherein the rods are formed of steel.

6. The pneumatic tire defined in claim 5 wherein the steel rods are brass coated.

7. The pneumatic tire defined in claim 1 wherein the rods have a linear length in the range of 7 inches and 8 inches.

8. The pneumatic tire defined in claim 1 wherein the rods have a straight linear configuration; in which the tire has a nominal tire section width; and in which the rod has a length of 0.0286 inches for each 1 mm of tire section width.

* * * * *